Sept. 23, 1969   GU-DIN TSEO   3,468,249
ARTICLE CONTROLLED DOCUMENT MARKING APPARATUS
FOR COPYING MACHINES
Filed Feb. 3, 1967   2 Sheets-Sheet 1

INVENTOR.
GU-DIN TSEO

BY

ATTORNEY

Sept. 23, 1969  GU-DIN TSEO  3,468,249
ARTICLE CONTROLLED DOCUMENT MARKING APPARATUS
FOR COPYING MACHINES
Filed Feb. 3, 1967  2 Sheets-Sheet 2

INVENTOR.
GU-DIN TSEO
BY *Anthony D. Cennamo*

ATTORNEY

United States Patent Office 3,468,249
Patented Sept. 23, 1969

3,468,249
ARTICLE CONTROLLED DOCUMENT MARKING
APPARATUS FOR COPYING MACHINES
Gu-Dia Tseo, Rochester, N.Y., assignor to Xerox Corporation, Rochester, N.Y., a corporation of New York
Filed Feb. 3, 1967, Ser. No. 613,785
Int. Cl. B41f 13/24
U.S. Cl. 101—235     10 Claims

ABSTRACT OF THE DISCLOSURE

Apparatus for placing identifying information on copied documents in which a porous ink impregnated marker is rotated to contact a document on the conveyor member of a copying machine by a friction roll in engagement with the conveyor member. Rotation of the marker is implemented by an electrically actuated magnetic clutch connecting the drive roll and the marker through a pair of switches one of which senses the position of a document on the conveyor member and the second of which senses the position of the marker. The switch arrangement insures marking only on a document and not on the conveyor member which is utilized as a platen for the marker.

Field of the invention

This invention relates generally to document marking apparatus and more particularly to apparatus for placing identifying information on documents which have been copied.

As a result of technological advances which have been made in the art of copying or reproducing machines, the use and application thereof has continually expanded. In many applications it has become necessary to keep a record for accounting purposes of those documents which have been reproduced. In other applications, although not always necessary, it is often desirable to know whether copies have been made from an original document or subject copy, to which it is often referred, merely by visual inspection of the subject copy.

For example, in business operations where a large number of merchandise orders are processed, facsimile transmission equipment is being utilized to a great extent. In such operations, however, some of the orders which are processed may not have been transmitted by facsimile equipment. Due to the fact that it may be necessary to assess an additional cost against those orders which have been transmitted, it is desirable to have this information conveniently available for use in preparing statements. Since statements are generally prepared from information contained on the original orders either at the time of processing or subsequent thereto it is advantageous to have this information on the original order rather than on additional sheets which may become detached or lost or confused with documents which have not been transmitted. It is also advantageous that this information be placed on the original order in a manner which is readily ascertainable upon visual inspection, yet which does not deface or mutilate information on the order to the extent of becoming indiscernible.

One method which fulfills these requirements is by utilizing apparatus which places identifying information on the document during the process of transmitting.

Such apparatus may also be advantageously used in conjunction with copying machines other than facsimile equipment. For example, where the use of copying machines is readily accessible, it may be desirable to have information on the document indicating that the document has been copied. Copying machines which place such identifying information on an original document when a copy is made have a tendency to prevent unauthorized copying of the originals.

Summary of the invention

Accordingly, it is an object of my invention to provide apparatus for use in copying machines or the like, for placing identifying information on documents which have been copied.

Another object of my invention is to provide an effective means for placing identifying information on a copied document without mutilating the document.

Another object of my invention is to provide document marking apparatus adapted for use in copying machines or the like for placing identifying information on documents which have been copied in which the conveyor member of the copying machine is utilized as the platen.

A further object of my invention is to provide document marking apparatus for use in copying machines or the like which is actuated for marking responsive to a document on the conveyor member reaching a predetermined position.

These and other objects of this invention are attained by providing rotatable marking means operatively aligned with the conveyor member of a copying machine and adapted upon rotation to contact a subject copy on the conveyor member, drive means operatively connected with the conveyor member for driving the marking means, and clutch means interconnecting the marking means and the drive means whereby upon actuation of the clutch means, the marking means rotates to contact a subject copy on the conveyor member thereby placing an identifying mark on the subject copy. Other objects of the invention will become readily apparent to those skilled in the art in view of the following detailed disclosure and description thereof especially when read in conjunction with the accompanying drawings.

Description of the preferred embodiments

Figure 1:
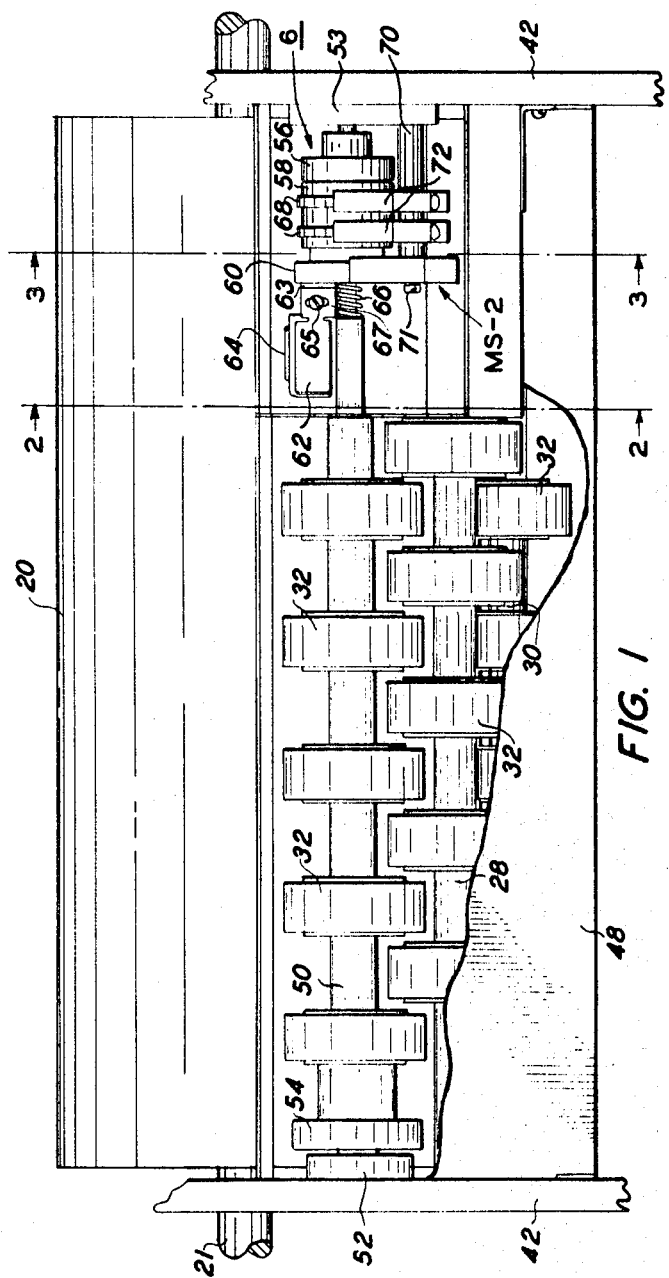
FIG. 1 is a side view of one embodiment of the document marking apparatus adapted for use in a facsimile transmission device.
Figure 2:
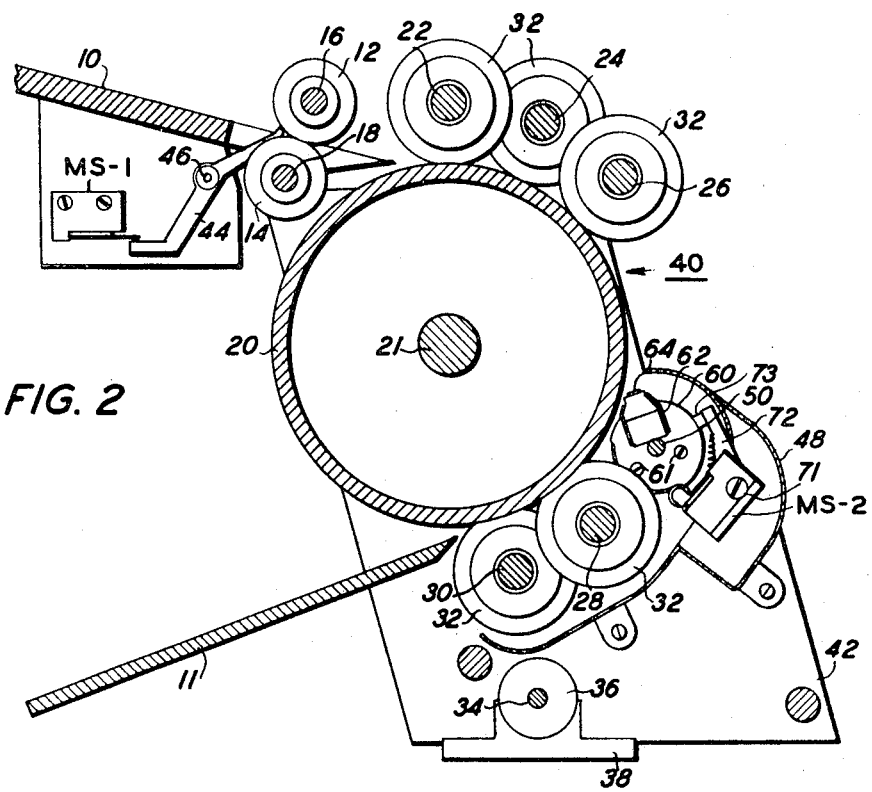
FIG. 2 is a sectional view of FIG. 1 taken along lines 2—2.
Figure 3:
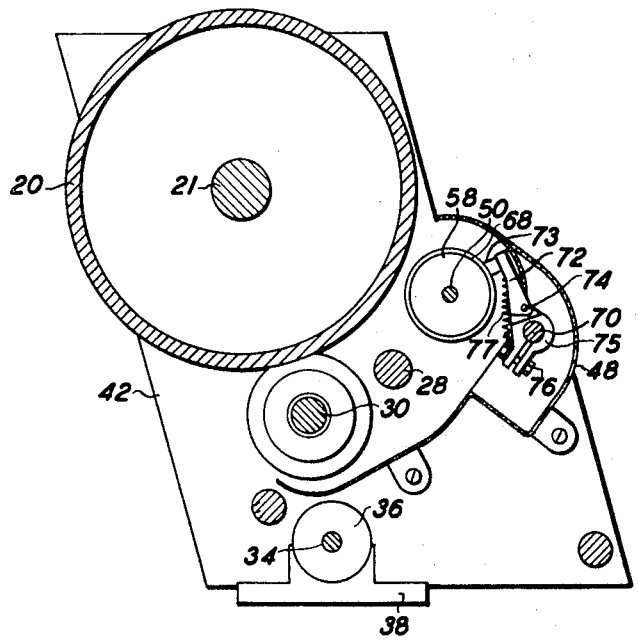
FIG. 3 is a sectional view of FIG. 1 taken along lines 3—3.

The document marking apparatus as shown in FIGS. 1 to 3 is particularly adapted for use in facsimile transmission equipment. As shown therein, to permit ready access to the scanning apparatus at the scanning station generally designated 40, the document conveyor unit is rotatably mounted about drive shaft 34 via bearings 36 and bearing blocks 38 in side frames 42. Shaft 21 which is also rotatably mounted in side frames 42 is operatively connected to drive shaft 34 and drives conveyor drum 20. A plurality of paper guide rollers 32 located about the periphery of drum 20 are rotatably mounted on shafts 22, 24, 26, 28, 30 and 50. Suitable housings such as 48 may be provided to surround the guide roll assemblies.

A pair of pinch rolls 12 and 14 mounted on shafts 16 and 18 respectively rotate in synchronism with conveyor drum 20. A document tray 10 provides a support and guide path for documents being fed into the machine.

Thus it may be seen that a document to be fed into the machine is placed on tray 10 and advanced to contact pinch rolls 12 and 14. As pinch rolls 12 and 14 rotate, the document is advanced contacting conveyor drum 20. The paper guide rolls hold the document against the periphery of conveyor member 20 as the document is advanced past the scanning station 40 and discharged from the machine onto discharge tray 11.

Marker drive shaft 50 as best seen in FIG. 1, carries a plurality of the rotatably mounted guide rolls 32 in addition to providing drive for the marker 64. As shown therein, shaft 50 is rotatably mounted between side frames 42 via bearings in bearing blocks 52 and 53. A friction drive roll 54 connected to shaft 50 is in frictional engagement with conveyor drum 20 and provides continuous synchronized rotation of shaft 50 with drum 20.

As shown in FIG. 1, an electrically actuated magnetic friction clutch unit generally designated 6 is mounted on shaft 50 for engaging and disengaging the drive between marker 64 and conveyor drum 20. The clutch unit generally designated 6 comprises an armature assembly 56 and a magnet assembly 58. Armature assembly 56 is connected to shaft 50 and includes an axially deflectable diaphragm having a friction facing thereon. Magnet assembly 58 is juxtapositioned from armature assembly 56 and in the de-energized state is idled on shaft 50 via a bearing arrangement which also provides operating clearance between armature 56.

Magnet assembly 58 includes an electromagnet which when energized establishes a magnetic field passing from the magnet to the armature thereby pulling the friction facing of the armature into contact with the magnet. Thus, upon energization, the magnet assembly 58 rotates with armature assembly 56. When the magnet is de-energized, the diaphragm of the armature assembly snaps back to its neutral position pulling the friction facing positively away from the magnet disengaging magnet assembly 58 from armature 56.

Marker mounting block 63 is connected to cam 60 and projects axially therefrom in the direction to the left as viewed in FIG. 1. Cam 60 is connected to magnet assembly 58 via bolts 61. Marker 64 is removably mounted in marker carrier 62 which is adjustably connected to marker mounting block 63 via screws 65 in slots 67. Spring 66 biases cam 60, magnet assembly 58 and hence marker 64 toward armature assembly 56.

Marker 64 is preferably comprised of a micro-porous plastic material having a relatively non-volatile supply of ink suspended within which is incorporated into the plastic at the time of manufacture. Ink on the imprinting surface of the stamp is picked up by the surface of a document which surface ink then is replaced by capillary action from the supply within.

Electrical contact with the magnet assembly is established through a pair of brushes 73 in contact with slip rings 68, as best seen in FIG. 3. A mounting post 70 connected to bearing block 53 extends parallel to shaft 50 for positioning brushes 73. Brushes 73 are mounted in brush carriers 72 and connected to mounting post 70 via adjustable clamps 75. Brush carriers 72 are pivotally mounted on clamps 75 via pins 74 and biased toward slip rings 68 by springs 77. Clamps 75 may be positioned so as to align brushes 73 with slip rings 68 with the desired bias in springs 77 and held in place by bolts 76. With the proper tension in springs 77 the friction between brushes 73 and slip rings 68 is sufficient to prevent rotation of magnet assembly 58 in the de-energized state.

A pair of two position switches MS–1 and MS–2 are utilized to engage and disengage clutch unit 6. As shown in FIG. 2, a first switch MS–1 is positioned adjacent the document feed path. As shown therein, a lever 44 pivoted as at 46 may be utilized to position the actuator of switch MS–1. As shown in FIG. 2 lever 44 has one end projecting into the document feed path and the other end engageable with the actuator of switch MS–1. Switch MS–2 is connected to mounting post 70 via screw 71. Cam 60 having a high point and a low point engages the actuator of switch MS–2 and displaces the actuator between the two switching positions.

Figure 4:
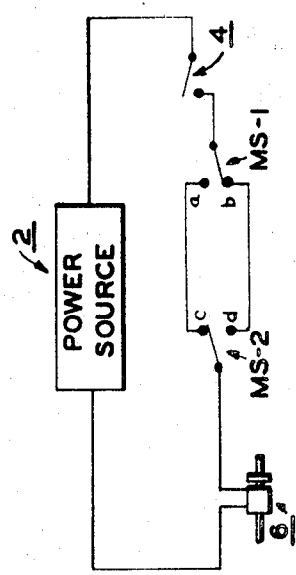
FIG. 4 is a schematic of the circuit arrangement which actuates the marking apparatus.

Referring to FIG. 4, the circuit for actuating the magnetic clutch unit 6 includes a main machine switch 4, switches MS–1 and MS–2, and a suitable power source 2. With switches MS–1 and MS–2 in the positions shown, the main machine switch 4 may be closed without energizing clutch unit 6. As a document is fed into the machine the leading edge contacts lever 44 moving switch MS–1 from position B to position A actuating clutch unit 6 and hence rotating marker 64 about shaft 50. Marker 64 rotates until reaching the position shown in FIG. 2 at which time the actuator of switch MS–2 reaches the low point on cam 60 moving switch MS–2 from position C to position D de-energizing clutch unit 6. As the infed document is advanced through the machine and the trailing edge passes over lever 44, switch MS–1 is changed from position A to position B at which time clutch unit 6 is again actuated, this actuation for the purpose of placing a mark on the document on conveyor drum 20. Marker 64 is brought into contact with the document as the drum rotates leaving a mark thereon and continues to rotate about shaft 50 until the high point of cam 60 reaches the actuator of switch MS–2. When this occurs switch MS–2 is changed from position D to position C, de-energizing clutch unit 6.

Thus it may be seen that clutch unit 6 is activated for two cycles of operation. The first being to pre-position marker 64 prior to marking, responsive to a document being fed into the machine, and the second being for the marking operation, responsive to a document being in proper marking position on the conveyor member. Through this arrangement the conveyor member of the machine serves as the platen for the marking unit eliminating the need of additional apparatus. The particular arrangement utilized thus provides an effective means for placing identifying information on a copied document. This arrangement insures against activation of a marking operation unless a document is positioned in the marking area on the conveyor member and eliminates the possibility of marking on the conveyor member.

What is claimed is:

1. In copying machines and the like having means for conveying a subject copy past a scanning station including an endless conveyor member defining a path of travel and a plurality of rotatable guide rolls for holding a subject copy in engagement with said conveyor member as the subject copy is advanced, document marking apparatus for placing identifying information on documents which have been copied including, marking means operatively aligned with said conveyor member and rotatable about an axis to contact a subject copy on said conveyor member, drive means coaxial with said marking means in frictional engagement with said conveyor member for driving said marking means, clutch means operatively associated with said drive means and said marking means and adapted upon actuation thereof to connect said drive means with said marking means, and means for actuating said clutch means to place identifying information on a subject copy in response to said subject copy reaching a predetermined position in said path of travel and said marking means being at a predetermined rotative position.

2. The apparatus as defined in claim 1, said marking means comprising a porous material impregnated with ink.

3. The apparatus as defined in claim 1 wherein said clutch means includes, a friction member, and an electromagnetic member for attracting said friction member.

4. The apparatus according to claim 3 wherein said clutch actuating means includes, first switch means responsive to a subject copy reaching predetermined positions in the document feed path and second switch means responsive to said marking means reaching predetermined positions of rotation.

5. The apparatus according to claim 3 wherein said clutch actuating means includes,
first switch means positioned adjacent said path of travel and operable by an infed subject copy in response to said subject copy reaching predetermined positions along said path of travel,
cam means operatively associated to rotate with said marking means, and
second switch means operable by said cam means in response to said marking means reaching predetermined positions of rotation.

6. Document marking apparatus adapted for use in copying machines or the like, for placing identifying information on documents which have been copied, said copying machines having means for conveying a subject copy past a scanning station including a conveyor member and a plurality of rotatable guide rolls for holding a subject copy in engagement with said conveyor member as the subject copy is advanced past the scanning station, said marking apparatus including,
marking means rotatable about an axis and adapted for contacting a subject copy on said conveyor member, said marking means comprising a porous material impregnated with ink,
cam means in juxtaposition and rotatable with said marking means,
drive means in continuous rotatable frictional engagement with said conveyor member for driving said marking means,
electromagnetic clutch means adapted upon actuation thereof to connect said drive means with said marking means whereby said marking means rotates to contact a subject copy on said conveyor member, and
condition responsive circuit means for actuating said clutch means including first switch means positioned adjacent the document feed path and operable by an infed subject copy responsive to reaching predetermined positions along the document feed path, and second switch means operable by said cam means responsive to predetermined rotative positions of said marking means.

7. In copying machines and the like having means for conveying a subject copy past a scanning station including an endless conveyor member defining a path of travel and a plurality of rotatable guide rolls for holding a subject copy in engagement with said conveyor member as the subject copy is advanced, document marking apparatus for placing identifying information on documents which have been copied including,
marking means operatively aligned with said conveyor member and rotatable about an axis to contact a subject copy on said conveyor member,
drive means coaxial with said marking means in frictional engagement with said conveyor member for driving said marking means,
electromagnetic clutch means operatively associated with said drive means and said marking means and adapted upon actuation thereof to connect said drive means with said marking means,
cam means operatively connected and rotatable with said marking means, and
condition responsive circuit means for cyclically actuating said clutch means including first switch means positioned adjacent the document feed path and operable between first and second conductive positions in response to an in-fed subject copy reaching predetermined locations along the document feed path, and second switch means operable by said cam means between first and second conductive positions in response to said marking means reaching predetermined positions of rotation.

8. Apparatus according to claim 7, said first switch means being biased to said first conductive position in response to a subject copy reaching a first location along the document feed path whereby to rotate said marking means to a pre-print position, and being biased to said second conductive position in response to a subject copy reaching a second location along said document feed path whereby to rotate said marking means to contact a subject copy on said conveyor member.

9. In copying machines and the like having means for conveying a subject copy past a scanning station including an endless conveyor member defining a path of travel and a plurality of rotatable guide rolls for holding a subject copy in engagement with said conveyor member as the subject copy is advanced, document marking apparatus for placing identifying information on documents which have been copied including,
marking means spaced from said conveyor member and rotatable about an axis to contact a subject copy on said conveyor member,
drive means coaxial with said marking means in continuous rotatable frictional engagement with said conveyor member for driving said marking means,
electromagnetic clutch means operatively associated with said drive means and said marking means and adapted upon actuation thereof to connect said drive means with said marking means,
cam means operatively connected and rotatable with said marking means, and
condition responsive circuit means for cyclically actuating said clutch means whereby to rotate said marking means through a non-print cycle in response to detection of in-fed documents and through a print cycle in response to documents being advanced to a print position by said conveyor member including,
first switch means positioned adjacent the document feed path at a predetermined location therealong and operable between first and second conductive positions, said switch means being normally biased to the second conductive position in the absence of documents in the feed path at said predetermined location and to the first conductive position in the presence of documents in the feed path at said predetermined location,
second switch means having a first conductive position electrically connected to said first conductive position of said first switch means and a second conductive position electrically connected to said second conductive position of said first switch means, said second switch means being normally biased to said first conductive position by said cam means through a first predetermined angular displacement of said marking means and to said second conductive position by said cam means through a second predetermined angular displacement of said marking means.

10. Apparatus according to claim 9, said marking means comprising a micro-porous ink impregnated plastic material.

References Cited

UNITED STATES PATENTS

| | | | |
|---|---|---|---|
| 2,318,465 | 5/1943 | Chollar | 101—125 |
| 2,802,416 | 8/1957 | Karkow | 101—235 |
| 3,037,447 | 6/1962 | Gonzalez et al. | 101—91 |
| 3,039,385 | 6/1962 | Siegel | 101—235 XR |
| 3,138,098 | 6/1964 | Worth | 101—235 XR |
| 2,443,953 | 6/1948 | Gillespie | 178—42 XR |
| 3,055,297 | 9/1962 | Leeds | 101—379 XR |
| 3,092,019 | 6/1963 | Van Buskirk | 101—235 XR |

ROBERT E. PULFREY, Primary Examiner

CLIFFORD D. CROWDER, Assistant Examiner

U.S. Cl. X.R.

101—245